(12) United States Patent
Wall et al.

(10) Patent No.: US 7,548,907 B2
(45) Date of Patent: Jun. 16, 2009

(54) PARTITIONING ELECTRICAL DATA WITHIN A DATABASE

(76) Inventors: Theresa Wall, 3036 Throne St., Murfreesboro, TN (US) 37129; Rekha Kaushik, 611 Sunnybrook Dr., Brentwood, TN (US) 37027; Loretta Stokes, 112 Winter Wood Dr. North, Murfreesboro, TN (US) 37129; Andy Mark McInturff, 13033 Halls Hill Pike, Milton, TN (US) 37118; Warren Patterson, 2 Observatory Rd., Charleston, WV (US) 25314

( * ) Notice: Subject to any disclaimer, the term of this patent is extended or adjusted under 35 U.S.C. 154(b) by 256 days.

(21) Appl. No.: 11/433,304

(22) Filed: May 11, 2006

(65) Prior Publication Data

US 2007/0266004 A1 Nov. 15, 2007

(51) Int. Cl.
*G06F 7/00* (2006.01)
(52) U.S. Cl. .......................................................... 707/3
(58) Field of Classification Search ..................... 707/3, 707/204
See application file for complete search history.

(56) References Cited

U.S. PATENT DOCUMENTS

| | | | |
|---|---|---|---|
| 6,487,457 B1 * | 11/2002 | Hull et al. | 700/17 |
| 6,657,553 B1 * | 12/2003 | Bergman et al. | 340/870.11 |
| 2004/0098415 A1 * | 5/2004 | Bone et al. | 707/200 |
| 2004/0128146 A1 | 7/2004 | Williams et al. | 705/1 |
| 2004/0210608 A1 * | 10/2004 | Lee et al. | 707/204 |

OTHER PUBLICATIONS

Energy Manager EXT brochure; Dated Aug. 11, 2005; Published by Electro Industries/GaugeTech, Westbury, NY.

Nexus Communicator 2.0 Log Database Structure; Dated Oct. 18, 2001; Revision 1.20; Published by Electro Industries/GaugeTech, Westbury, NY.

DEC Data Systems: "DEC Data Systems—DataWise Manual" May 6, 2006, XP002470188, p. 5-p. 6, p. 58-60, p. 129.

Don Landing et al.: "Sensor Data Analysis Framework Research Roadmap—Integrating Stream Processing and Persistent Data Retrieval", Feb. 2006, XP002470189, the whole document.

Harrison M: "EPC Information Service—Data Model and Queries" Internet Citation, Oct. 1, 2003, XP002355668, the whole document.

Gehrke J et al: "Sensor and Actuator networks—Query processing in sensor networks" IEEE Pervasive Computing, IEEE Service Center, Los Alamitos, CA, US, vol. 3, No. 1, Jan. 2004, pp. 46-55, XP0011108155, the whole document.

(Continued)

*Primary Examiner*—Charles Rones
*Assistant Examiner*—Fazlul Quader

(57) ABSTRACT

A method of partitioning and archiving electrical data received from a power monitoring system in a database including a plurality of tables organized by at least group and date. Data in the database is queried by first searching an electrical data catalog to determine whether the data exists in the database before searching the database. The data is targeted by group and by date, yielding faster response times and enhanced database scalability. An electrical data retention table includes a set of rules governing, for each group, the maximum age of the data that can be stored in the table in the database. A data table associated with a particular group whose age exceeds the maximum age provided in the set of rules is removed from the database and from the electrical data catalog. If desired, the entire data table can be imported back into the database.

12 Claims, 5 Drawing Sheets

OTHER PUBLICATIONS

Bonnet P et al: "Querying the Physical World" IEEE Personal Communications, IEEE Communications Society, US, vol. 7, No. 5, Oct. 2000, pp. 10-15, XP000966619, the whole document.

Ledlie J et al: "Provenance-Aware Sensor Data Storage" Data Engineering Workshops, 2005, 21st International Conference on Tokyo, Japan Apr. 5-8, 2005, Piscataway, NJ, USA, IEEE, Apr. 5, 2005, pp. 1189-1189, XP010924091, the whole document.

Kevin Chang et al: "SensorBase.org—A Centralized Repository to Slog Sensor Network Data" Center for Embedded Network Sensing. Papers. Paper 116, May 5, 2006, XP002470190, the whole document.

Written Opinion corresponding to co-pending International Patent Application Serial No. PCT/US2007/011247, European Patent Office, dated May 15, 2008, 12 pages.

International Search Report corresponding to co-pending International Patent Application Serial No. PCT/US2007/011247, European Patent Office, dated May 15, 2008, 8 pages.

* cited by examiner

PARTITIONING ELECTRICAL DATA WITHIN A DATABASE

FIELD OF THE INVENTION

This invention is directed generally to database systems, and, more particularly, to partitioning data received from a monitoring system within a database, such as a database coupled to a power monitoring system.

BACKGROUND OF THE INVENTION

Microprocessor-based electrical power equipment such as power monitors, lighting control systems, meters, circuit breaker controllers and the like accumulate considerable amounts of information concerning the electrical distribution systems to which they are connected, as well as the power equipment itself. The amount of such information generally increases over the operating life of the equipment, not only because of the retention of required historical information but also because of the increasingly complex functions being performed by such equipment. The information from the power monitoring systems and the like can be stored in a database. By querying the database, certain categories of data can be requested from the database, which is interpreted or manipulated to produce useful reports or other informational tools for identifying patterns, problems, or other anomalies in a particular set of data. As the amount of data increases, the database response times increase because there is more data that must be searched to ensure a complete result. Much of that data may be irrelevant or not important for the particular query. For example, historical data older than three months may not be relevant to a query for data representing the currents and voltages at a particular metering point. Yet, the presence of such "stale" or aging historical data poses an impediment to the database search engine, rendering it sluggish and slower to respond.

Slow database response times results in various disadvantages. Operators querying for data could lose patience with the lengthy response time and slow performance associated with data requests, and, as a result may actually be discouraged from running such queries in a manner that adversely affects operations and productivity. In addition, as databases become filled with data that may be disjointed, disorganized, and enormous in size, more sophisticated processes are required in order to extract and analyze the data. The process of searching large amounts of data for patterns is typically referred to as data mining. There exists sophisticated commercial tools for data mining, such as OLAP (on line analytical processing) tools, but while these tools can enhance database performance, they are expensive, complex, and bug-susceptible, which increases overall complexity of designing, maintaining, and interacting with the database system.

Performance is also adversely affected with respect to archiving data. Over time, performance begins to decrease as the bulk of data stored in a database table increases. To archive old data, it must be retrieved, saved to an external file, and removed from the database table. After the archived data is removed, the database server must reorganize the remaining data, which also results in performance decrease.

Thus, a need exists for an improved apparatus and method. The present invention is directed to satisfying one or more of these needs and solving other problems.

SUMMARY OF THE INVENTION

In an embodiment of the present invention, a method of partitioning electrical data in a database includes receiving data from a monitoring system that monitors measurable quantities of a utility, the data including time data representing at least the date the monitored data was acquired; creating a plurality of tables in the database, each table being associated with a group and a date that are distinct from every other table in the database; and storing a value of the monitored data in one of the plurality of tables based on at least the group to which the value belongs and the date the value was acquired. In various embodiments, the method may further include querying the database for first monitored data belonging to a first group and acquired on a first date; determining whether the first monitored data is present in the database by searching a data catalog stored in the database, the data catalog being logically distinct from the plurality of tables; and responsive to the determining, if the data catalog indicates the presence of the first monitored data, retrieving the first monitored data from the table associated with the first group and the first date. The method may still further include, responsive to the determining, if the data catalog does not indicate the presence of the first monitored data, searching an archive database for the first monitored data based on its associated first group and first date.

In various embodiments, the method may further include storing a set of data retention rules in the database, the rules indicating, for each group with which the tables are associated, a retention date range during which monitored data is stored in the database; and based on the data retention rules, archiving monitored data to an archive database when a date associated with the monitored data to be archived falls outside of the retention date range associated with the group to which the monitored data to be archived belongs. If the value of the monitored data does not belong to any group in the database, the method may write the monitored data received to a table of rejected data.

In some embodiments, a computer readable storage medium encoded with instructions for directing a controller to perform any of the methods herein. The utility may be selected from the group consisting of water, air, gas, energy, steam, and weather. The monitoring system is preferably a power monitoring system, the utility is preferably energy, and the monitored data is electrical data. The at least one group may, in various embodiments, be a group that includes topics that relate to electrical energy, electrical current, power quality, or electrical demand, to name a few. In the electrical energy group, the topics may include real energy, reactive energy, and apparent energy. In the electrical current group, the topics may include current, average current, and maximum current. In the power quality group, the topics may include total harmonic distortion (THD) current, THD voltage, harmonic factor, distortion power factor, total demand distortion, crest factor, and K-factor. In the electrical demand group, the topics may include demand current, K-factor demand, peak demand current, coincident demand, demand power, peak demand power, KW demand, KVAR demand, and KVA demand.

In another embodiment of the present invention, a method of archiving electrical data includes creating in a database a plurality of tables, each table being associated with a distinct group and a distinct date relative to all other tables in the database; storing electrical data that includes data corresponding to a group and a date in the corresponding one table associated with that corresponding group and that corresponding date, the electrical data being received from a power monitoring system; providing a set of rules for retaining data in the database, the set of rules indicating on a per group basis the maximum age of data that can be stored in each group; and removing from the database a first table whose data corresponds to a date that exceeds the corresponding maximum age for the group to which the first table belongs as provided in the set of rules.

The method may further include archiving the first table in a data archive, and the archiving may be carried out remote from the database. The set of rules may be stored in an electrical data retention table in the database. In some embodiments, the method may further include storing the first table in an archive database; providing an electrical data catalog in the database that includes at least a plurality of entries identifying the tables and their corresponding groups and dates; and responsive to removing from the database the first table, removing from the electrical data catalog the entry corresponding to the first table. In other embodiments, the method may further include importing from the archive database the first table into the database; and writing into the electrical data catalog an entry corresponding to the first table.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENT

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
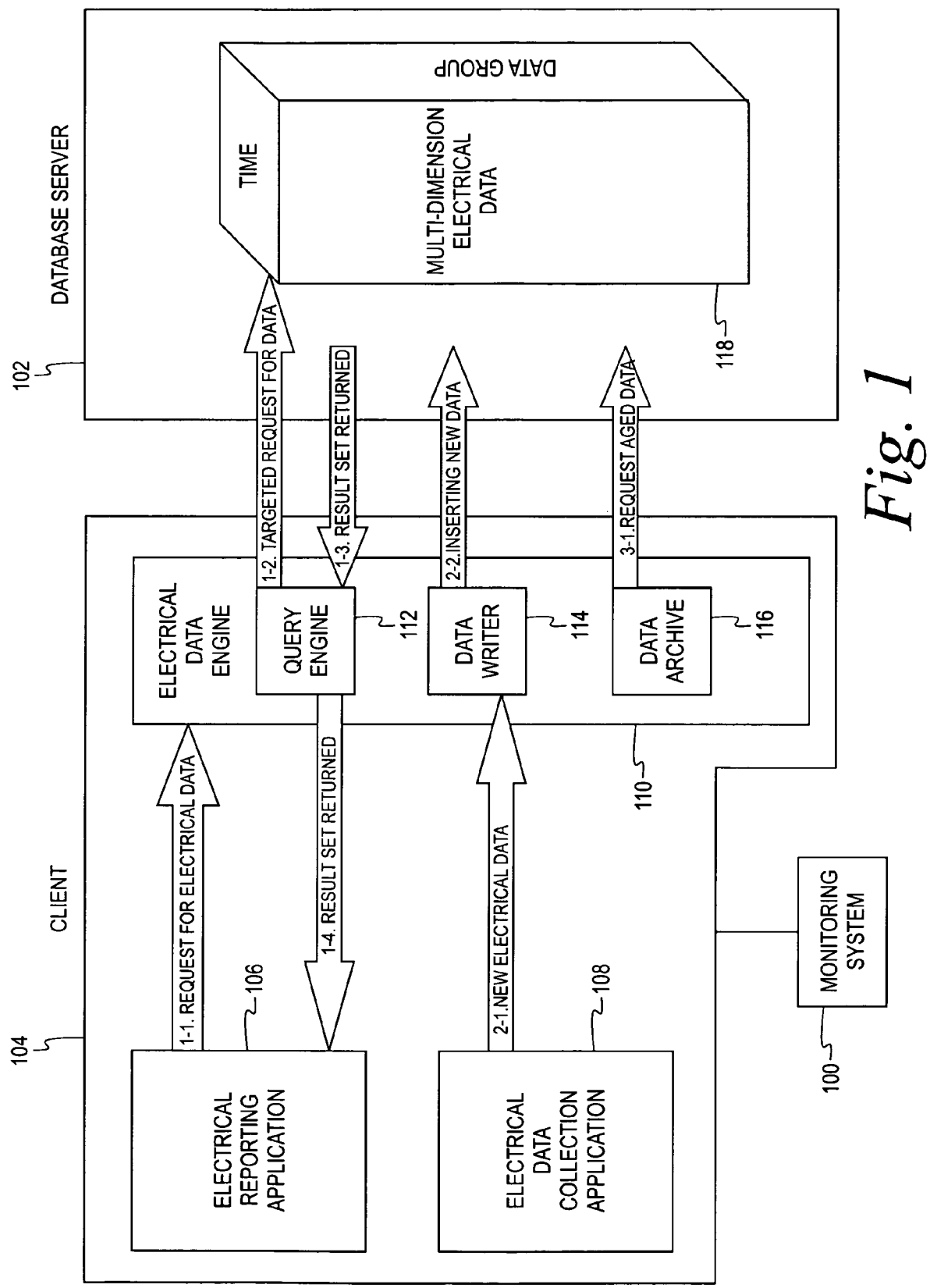
FIG. 1 is a functional block diagram of a system including a database for storing partitioned electrical data according to an aspect of the present invention.

Referring now to the drawings, and initially to FIG. 1, a block diagram is shown of a monitoring system 100 coupled to a database or database server 102. The monitoring system 100 is connected to a client computer 104 that runs an electrical reporting application 106, which generates reports based on electrical data received from the monitoring system 100. These reports are displayed on the client computer 104 for various trouble-shooting, diagnostic, monitoring, and other purposes. It should be emphasized that as used herein the monitoring system 100 may be any system that monitors measurable characteristics of a utility, including water, air, gas, energy, steam (collectively abbreviated as WAGES), and weather. An implementation is a power monitoring system, and the illustrated embodiments herein are directed to a power monitoring system; however, it should be understood that the present invention applies as equally to power monitoring systems as to other WAGES monitoring or weather station systems.

A power monitoring system 100 is typically arranged in a hierarchy with monitoring devices such as electrical meters installed at various levels of the hierarchy. Monitoring devices measure various characteristics of the electrical signal (e.g., voltage, current, waveform distortion, power, etc.) passing through the conductors, and the data from each monitoring device is collected by local data collection points within the system and communicated to a central reporting system for further massaging or analysis. The central reporting system includes a client computer 104 that generates reports based on the data received from the power monitoring system 100. As used herein, the client computer 104 may be comprised of a single computer or multiple computers.

The client computer 104 runs various software applications, including an electrical reporting application 106 and an electrical data collection application 108. Both interface with an electrical data engine 110 that includes a query engine 112, a data writer 114, and a data archiver 116. The electrical data engine 110 is coupled to the database or database server 102.

Data flow between the client computer 104 and the database server 102 may be generally described as follows. The electrical reporting application 106 makes a request for electrical data (1-1), and the request is passed to the query engine 112 of the electrical data engine 110. The query engine 112 converts the request into an appropriate language, such as structured query language (SQL), multidimensional expressions (MDX), or other suitable query language. Because the operator may not be familiar with SQL or MDX, a more simplified and intuitive GUI is provided for the operator to input requests for data, and the query engine 112 converts those requests into a language that the database server 102 can understand.

After formulating the appropriate query, the query engine 112 sends a targeted request for data to the database server 102 (1-2). The database server 102 includes tables of multi-dimensional electrical data 118 that are organized by time (for example month and year) and data group (examples of data groups are provided below). The multi-dimensional electrical data 118 is a conceptual illustration of the organization of data within a table. Examples of how electrical data is stored in multiple tables is described in connection with FIGS. 2-4 below.

The database server 102 may be a standalone computer remote from the client computer 104 in an embodiment, or, alternatively, in other embodiments, the database server 102 and the client computer 104 may be part of a single computer. The database 102 would take the form of a hard drive or hard drive array that may be physically or logically separate from the memory structures that comprise the client applications 106, 108. In still other embodiments, the client computer 104 may be connected to the database server 102 via a network, such as a LAN, the Internet, and the like.

If the electrical data requested by the query engine 112 is present in the database 102, the database 102 returns the result set to the query engine 112 (1-3). The query engine 112 may format or massage the electrical data before returning the result set to the electrical reporting application 106 (1-4), which uses the electrical data to generate reports concerning the power monitoring system 100.

The other client application, the electrical data collection application 108, is operable to insert new data into the database 102. The electrical data collection application 108 is coupled to local data collection points in the power monitoring system 100 and is operable to request and/or collect data received from the monitoring devices within the power monitoring system 100. When new data is received by the electrical data collection application 108, it is provided to the data writer 114 of the electrical data engine 110 (2-1), which formats the new data for insertion into the database 102 (2-2). The database 102 either accepts the new data and stores it in an appropriate table therein, or it rejects the new data, whereupon it may be stored in a queue or returned to the electrical data collection application 108 with an appropriate explanatory message. Data insertion will be explained in more detail below in connection with FIGS. 4 and 5.

Finally, the data archiver 116 of the electrical data engine 110 requests aged data (3-1) either from the database 102 or from an archive database 206. The archived data may be stored in the database 102 (such as in a physically or logically separate area of the database 102) where up-to-date data is also stored or in another database. As will be explained below, an aspect of the present invention is that when data is archived, entire tables are archived for ease of later retrieval. As a result of archiving entire tables of data, the present invention decreases response times and increases the efficiency of importing archived data.

As mentioned above, an aspect of the present invention is that electrical data is organized by group and also by date (for example, month and year). A group is a logical category comprising multiple topics that relate to the group. For example, a non-exhaustive illustrative example of groups include: Currents, Voltages, Powers, Demand Readings, Energies, Power Factors, Power Quality, Unbalance Readings, Fundamental Phasors, Minimum Readings, Maximum Readings, Ratings, Demand Voltages, Spectral Components, Breaker/Trip Unit Status, Cycle-by-Cycle, Trending, Input Metering, Water, Air, Gas, Steam, and Weather Station. Each group includes a number of topics, where each topic logically relates to the group name. A topic is also referred to as a characteristic or a measurement. For example, the following Table 1 illustrates some examples of group names and topics (characteristics):

TABLE 1

| Group Name | Topic ID (separate topics delimited by commas or slashes) |
|---|---|
| Currents | Current, Avg Current, Max Current, % Load |
| Voltages | Voltage, Avg Voltage |
| Powers | Real/Reactive/Apparent Power, Fundamental Real/Reactive Power, Harmonic Real Power |
| Demand Readings | Demand Current, K-Factor Demand, Peak Demand Current, Coincident K-Factor Demand Peak, Coincident Current Demand Peak, Demand (Real/Reactive/Apparent) Power, Peak Demand (Real/Reactive/Apparent) Power, KW/KVAR/KVA Demand, Electric KW Demand Synch Pulse |
| Energies | Real/Reactive Energy Into/Out of Load, Apparent/Real/Reactive Energy, Conditional/Incremental Real/Reactive/Apparent Energy In/Out, Present Interval Incremental Real/Reactive/Apparent Energy In/Out, Electric Accumulated Energy |
| Power Factors | Power Factor, Displacement Power Factor |
| Power Quality | THD/thd Current, THD/thd Voltage, K-Factor, Crest Factor, Harmonic Factor, Distortion Power Phase/Factor, Harmonic Current, Harmonic Voltage, Harmonic Voltage, Harmonic Voltage, Total Demand Distortion |
| Unbalance Readings | Current Unbalance, Voltage Unbalance |
| Fundamental Phasors | Fundamental Current Magnitude/Angle, Fundamental Voltage Magnitude/Angle |
| Minimum Readings | Minimum Temperature, Minimum Current, Minimum Voltage, Minimum Power Factor, Minimum Displacement Power Factor, Minimum Real/Reactive/Apparent Power Factor, Minimum THD/thd Current/Voltage, Minimum K-Factor, Minimum Crest Factor, Minimum Fundamental Real/Reactive Power, Minimum Harmonic Factor/Current/Voltage, Minimum Harmonic Real Power, Minimum Analog Input, Minimum Fundamental Current/Voltage, Minimum Distortion Power |
| Maximum Readings | Maximum Temperature, Maximum Current, Maximum Voltage, Maximum Power Factor, Maximum Displacement Power Factor, Maximum Real/Reactive/Apparent Power Factor, Maximum THD/thd Current/Voltage, Maximum K-Factor, Maximum Crest Factor, Maximum Fundamental Real/Reactive Power, Maximum Harmonic Factor/Current/Voltage, Maximum Harmonic Real Power, Maximum Analog Input, Maximum Fundamental Current/Voltage, Maximum Distortion Power |
| Ratings | Rated Ampacity, Rated Nominal Voltage, Rated KW/KVA/THD/Power Factor/KVAR, Rated Temperature, Rated User Defined Value |
| Demand Voltages | Demand Voltage, Min/Max Demand Voltage |
| Spectral Components | Meter Type, Voltage/Current Magnitude/Angle |
| Breaker/Trip Unit Status | Breaker Position, Trip Unit Door Status, Time Remaining to LT Trip, Remote Opening/Closing Enabled, Remote Control Enabled, Spring Charged, Breaker Ready to Close, |

TABLE 1-continued

| Group Name | Topic ID (separate topics delimited by commas or slashes) |
| --- | --- |
| | Relay Module Status, Current Unbalance Alarm Status, Over-current Demand Alarm Status, Under/over-voltage Alarm Status, Reverse Power Alarm Status, Under/over Frequency Alarm Status, Phase Rotation Alarm Status, Load Shed Current Alarm Status, Load Shed Power Alarm Status, Current Unbalance Pre-Alarm Status |
| Cycle-by-Cycle Trending | Cycle-by-cycle current, Cycle-by-cycle voltage Meter Register Number, Scale Factor, 1-Minute/1-Hour/1-Day/1-Month Reading Last Second/Minute/Hour/Day/Month/Year, 1-Minute/1-Hour/1-Day/1-Month Statistics Avg Reading, Daily/Hourly Forecast Std Deviation/Avg Reading, Summary of Hourly/Weekly Statistics Avg/Min/Max/Std Dev |
| Input Metering | Consumption Units, Rate Units, Demand Last, Present Demand, Avg Demand Calc, Peak Demand, Cumulative Usage |
| Water | Water Flow, Water Flow Previous Day Total, Water Flow Current Day Total, Water Flow Incremental, Water Flow Rate, Water Flow Rate Min/Max/Hourly Average/Daily Average/Weekly Average/Monthly Average, Water Heat Flow, Water Heat Flow Min/Max/Hourly Avg/Daily Avg/Weekly Avg/Monthly Avg, Water Temperature Supply, Water Temperature Supply Min/Max/Hourly Avg/Daily Avg/Weekly Avg/Daily Avg, Water Temperature Return, Water Temperature Return Min/Max/Hourly Avg/Daily Avg/Weekly Avg/Daily Avg, Water Flow Rate, Water Flow Rate Min/Max/Hourly Avg/Daily Avg/Weekly Avg/Daily Avg, Sewage Flow Rate, Sewage Flow Rate Min/Max/Hourly Avg/Daily Avg/Weekly Avg/Daily Avg |
| Air | Air Pressure, Air Pressure Min/Max/Hourly Avg/Daily Avg/Weekly Avg/Daily Avg, Air Flow, Air Flow Min/Max/Hourly Avg/Daily Avg/Weekly Avg/Daily Avg, Air Temperature, Air Temperature Min/Max/Hourly Avg/Daily Avg/Weekly Avg/Daily Avg |
| Gas | Gas Flow, Gas Flow Min/Max/Hourly Avg/Daily Avg/Weekly Avg/Daily Avg, Gas Flow Rate, Gas Flow Rate Min/Max/Hourly Avg/Daily Avg/Weekly Avg/Daily Avg, Gas Temperature, Gas Temperature Min/Max/Hourly Avg/Daily Avg/Weekly Avg/Daily Avg, Gas Pressure, Gas Pressure Min/Max/Hourly Avg/Daily Avg/Weekly Avg/Daily Avg |
| Steam | Steam Flow, Steam Flow Min/Max/Hourly Avg/Daily Avg/Weekly Avg/Daily Avg, Steam Flow Rate, Steam Flow Rate Min/Max/Hourly Avg/Daily Avg/Weekly Avg/Daily Avg, Steam Heat, Steam Heat Min/Max/Hourly Avg/Daily Avg/Weekly Avg/Daily Avg, Steam Temperature, Steam Temperature Min/Max/Hourly Avg/Daily Avg/Weekly Avg/Daily Avg, Steam Pressure, Steam Pressure Min/Max/Hourly Avg/Daily Avg/Weekly Avg/Daily Avg |
| Weather Station | Barometric Pressure, Barometric Pressure Min/Max/Hourly Avg/Daily Avg/Weekly Avg/Daily Avg, Dew Point, Dew Point Min/Max/Hourly Avg/Daily Avg/Weekly Avg/Daily Avg, Relative Humidity, Relative Humidity Min/Max/Hourly Avg/Daily Avg/Weekly Avg/Daily Avg, Wind Speed, Wind Speed Min/Max/Hourly Avg/Daily Avg/Weekly Avg/Daily Avg, Wind Direction, Temperature, Temperature Min/Max/Hourly Avg/Daily Avg/Weekly Avg/Daily Avg, Solar Radiation, Solar Radiation Min/Max/Hourly Avg/Daily Avg/Weekly Avg/Daily Avg, Precipitation, Precipitation Previous/Current Day Total |

It should be understood that the foregoing list of groups/topics is exemplary only, and fewer or more or different groups and topics may be used in various embodiments of the present invention. The general idea here is that data values that relate to a common logical theme are grouped together. Tables in the database 102 are organized by group, and data values that relate to those topics (characteristics) associated with each group are stored in separate tables. The tables are further organized by date (month and year in an exemplary embodiment) so that there is a separate table per group per date for every group in the database 102. Aged tables associated with dates that are aged are removed from the database 102 and archived for later retrieval. The removal of aged tables from the database 102 increases retrieval performance and database scalability because there is less data to wade through in response to queries and because the data that is searched is organized in a disciplined way. Archiving of aged tables is handled by a set of rules stored in an electrical data retention table 204 (see FIG. 2), and each rule may differ by group. For example, certain data may have a shorter life cycle than other data and should be archived on a quicker basis. For example, current and voltage data have a relatively short life cycle and therefore may need to be archived on a monthly basis (in other words, when the data is over a month old, tables containing current and voltage data older than a month are automatically archived by the database 102 into a data archive). On the other hand, trending data may have a longer life cycle and should be retained longer. The set of rules governing which groups of data are archived and when they should be archived are stored in the electrical data retention data table 204 shown in FIG. 2, which is discussed in more detail below in connection with FIG. 2.

Multiple groups may also be categorized under a single data type, such as Alarms, Events, and Historical Data. Thus, the following terminology is used to refer to increasingly specific components associated with any given table: type, group, topic, value.

Figure 2:
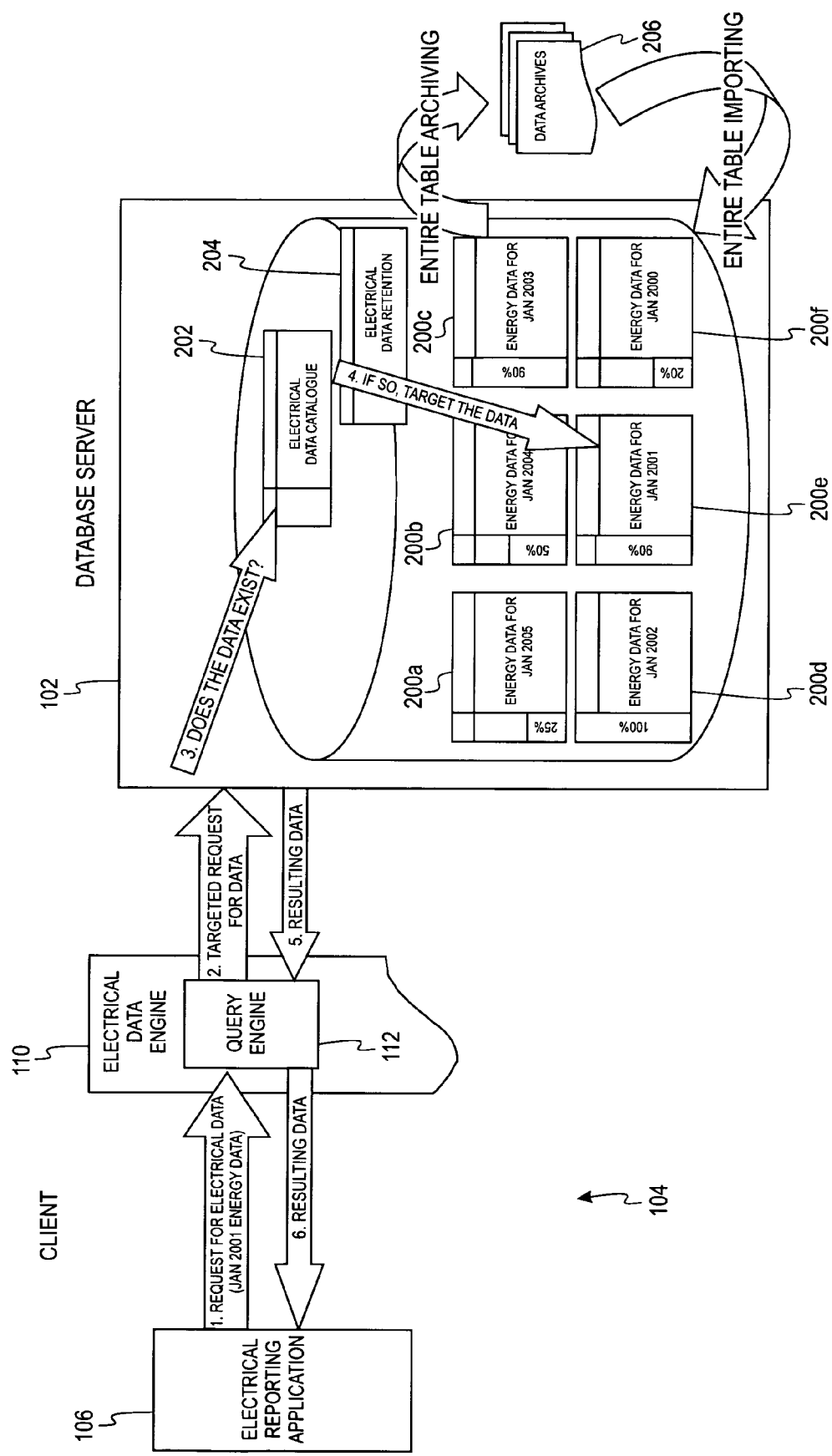
FIG. 2 is a functional block diagram of a query for electrical data from the database shown in FIG. 1 according to an aspect of the present invention.

FIG. 2 illustrates the flow of a request for electrical data that results in data being passed back to the requesting source from the database 102. The electrical reporting application 106 sends to the electrical data engine 110 a request for electrical data. In the example shown, the request is for January 2001 Energy Data. In the request, the group is "Energy," and the date is "January 2001." The query engine 112 formats the request into the appropriate query language for the database 102 and sends the query command to the database 102. The database 102 searches an electrical data catalog 202 to determine whether the requested data exists. The electrical data catalog 202 is essentially a table or index of tables that presently exist in the database 102. If a table is archived and removed from the database, the index in the electrical data catalog 202 is updated to remove (or mask) that table from the listing in the index of the electrical data catalog 202. The electrical data catalog 202 significantly increases performance and scalability in that the numerous tables in the database 102 do not need to be searched to determine whether data pertaining to the request (January 2001 Energy Data) exists in the database 102 in the first instance.

If the group and date combination associated with the requested data is found in the electrical data catalog 202, the database 102 targets the requested data from the appropriate table. In FIG. 2, six exemplary tables 200a-f are shown (obviously, there are numerous other tables that are not shown for ease of illustration). The targeted table is table 200e, which represents the Energy data for January 2001. Note that the tables 200a-f all relate to the Energy group, and there is a separate table for each month/year combination (January 2005, January 2004, and so forth). The resulting data from the targeted table 200e is returned to the query engine 112, which passes the data back to the electrical reporting application 106. The partitioning schema of the present invention avoids having to search through all the data of a database in order to locate the requested data. It also avoids having to use sophisticated, complex, and expensive database tools such as OLAP to manipulate and organize the data in the database before efficient searching can be carried out. However, the present invention does not preclude the use of sophisticated database tools such as OLAP tools.

Another aspect of the present invention shown in FIG. 2 is table-archiving. Archiving and importing of tables according to an embodiment of the present invention is performed on a per-table basis. The archived tables are removed from the database 102 and stored in data archives 206, which may be logically separate from the physical storage medium where the tables 200a-f are stored, physically separate and remote therefrom, or stored on a separate hard drive or different logical or physical partition of a hard drive within the database server 102. Wherever they are stored, they are removed from the database 102 on a per-table basis and stored in the archives 206 on a per-table basis. When aged data from an archive 206 is requested, the relevant table(s) containing the aged data are imported in their entireties back into the database 102. They can then be returned to the archives 206 (and removed or masked from the electrical data catalog 202) after the targeted data has been passed back to the requesting source.

The timing of when data is archived is determined by a set of rules provided in an electrical data retention table 204 in the database 102. The electrical data retention table 204 includes a set of rules that indicate, on a per-group basis, the maximum age of data that can be stored in each group. For example, a rule may be simply an entry in the electrical data retention table 204 that has two fields: the name of a group and a period of time indicating how long that group can remain in the database 102. For example, a rule may provide: current and 3 months. Such a rule would instruct the database 102 to archive on a per-table basis any tables belonging to the current group whose data is older than 3 months. Another rule may provide: maximum readings and 1 year. Such a rule would instruct the database 102 to archive on a per-table basis any tables belonging to the maximum readings group whose data is older than one year. When a table is removed from the database 102, its corresponding entry is also removed (or masked) from the electrical data catalog 202. By "masked" it is meant that the entry may simply be hidden or otherwise dormant or inaccessible until unmasked. In other words, it is not necessary to actually remove or delete the entry; rather it may simply be masked or hidden so that searches ignore the entry.

Figure 3:
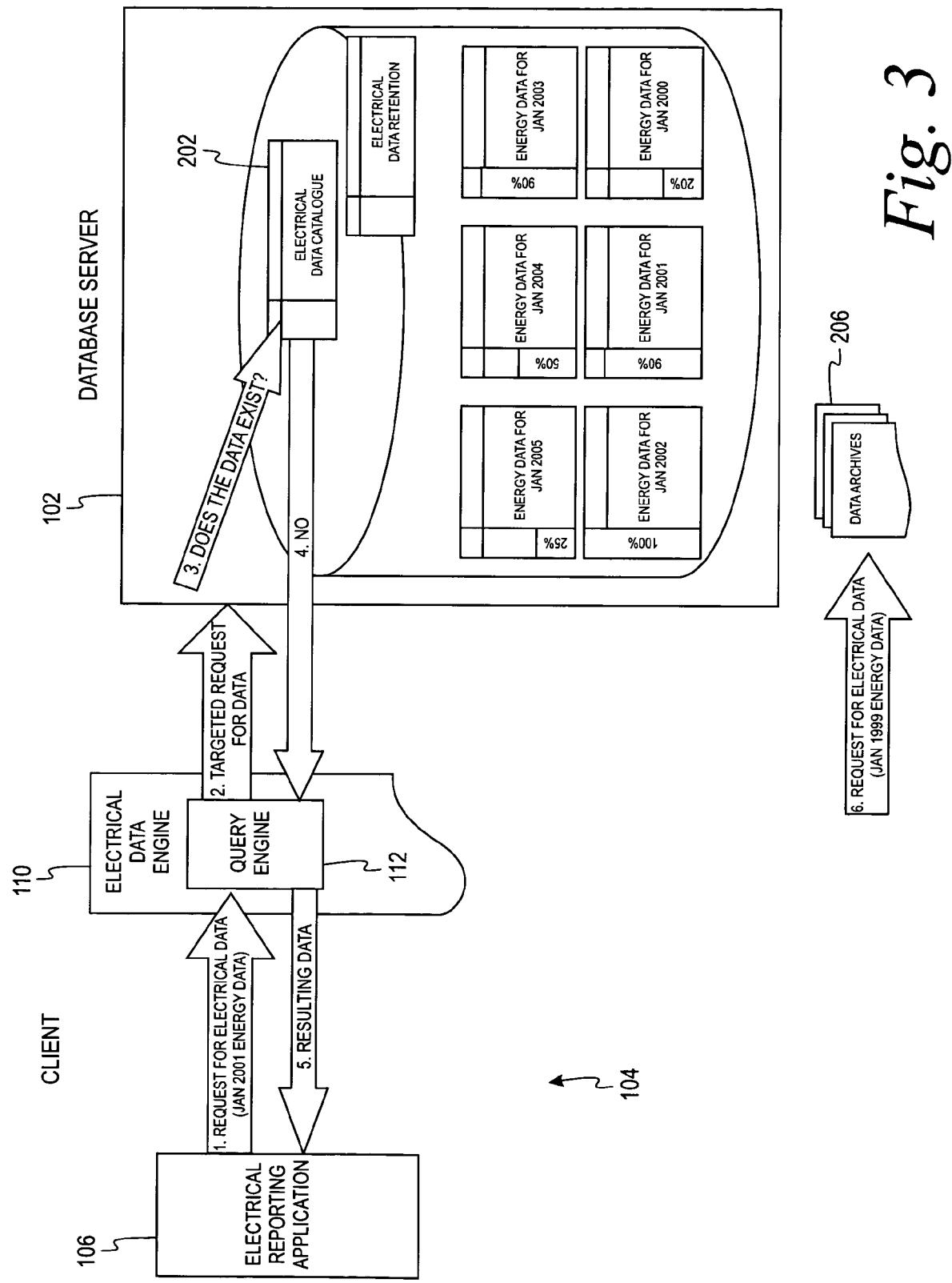
FIG. 3 is a functional block diagram of a query that returns no electrical data from the database shown in FIG. 1 according to an aspect of the present invention.

In FIG. 3, the database 102 does not have the requested data (here, January 1999 Energy data). Again, the electrical data catalog 202 is queried to determine whether the requested data exists, which reports that it does not. No data is returned to the electrical reporting application 106 and software running on the client computer 104 may inform the operator that the requested data does not exist in the database 102.

The operator may then run a targeted query in the data archives 206 for the archived data (January 1999 Energy data), or the operator may request that the relevant data archive be imported back into the database 102 (and the electrical data catalog 202 correspondingly updated) so that queries can return the requested data from the database 102 without having to extract the aged data separately from the archives 206. Later, the aged data may be returned to the data archives 206 and removed from the electrical data catalog 202 when it is no longer needed.

Figure 4:
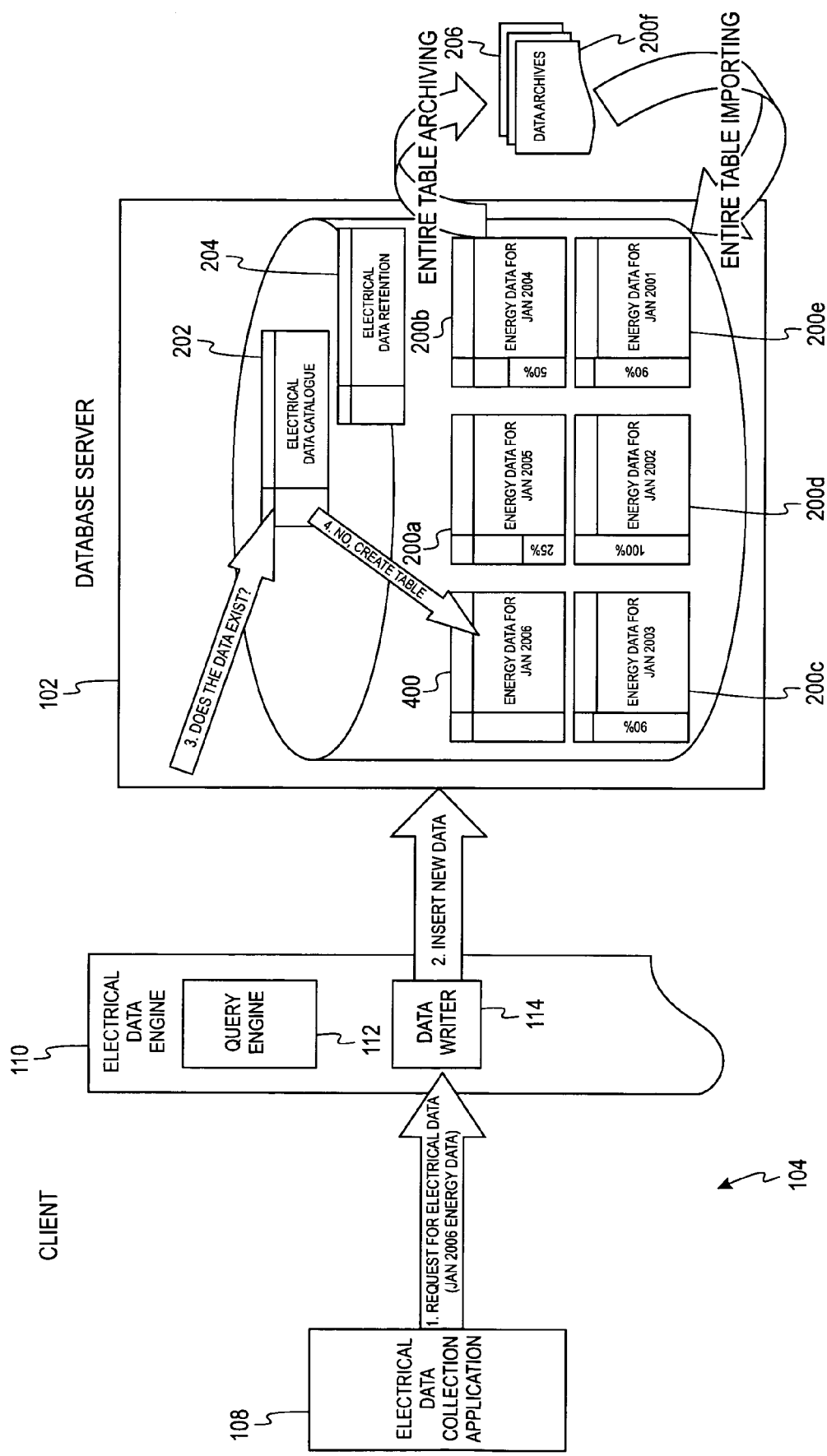
FIG. 4 is a functional block diagram illustrating a data writer component that attempts to write new data into the database shown in FIG. 1 according to an aspect of the present invention.
Figure 5:
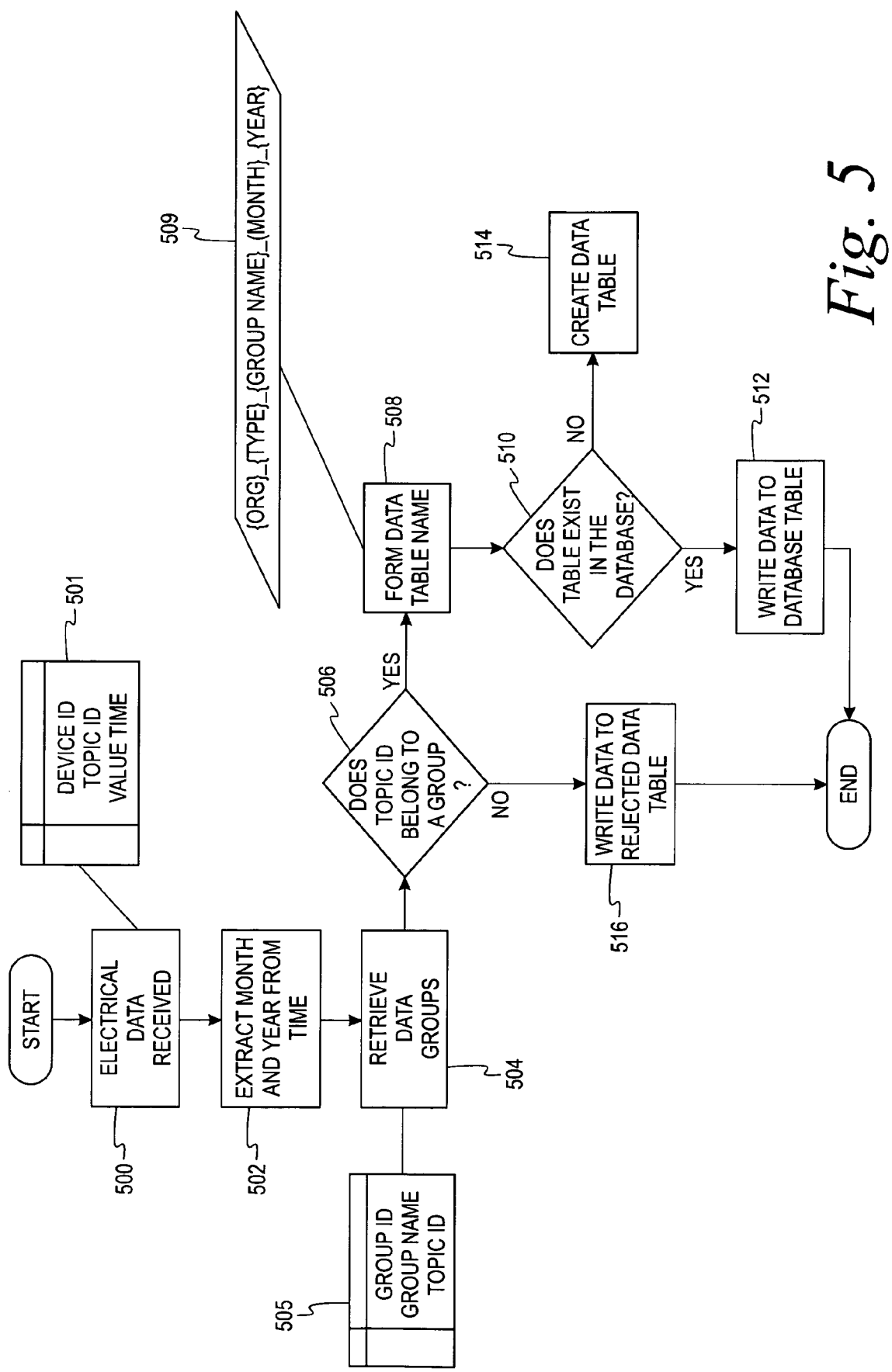
FIG. 5 is a flow chart diagram of a method for partitioning electrical data according to an aspect of the present invention.

Turning now to FIGS. 4 and 5, a procedure is illustrated for inserting new data into the database 102. The electrical data collection application 108 sends new electrical data (January 2006 Energy data in the illustrated example) to the data writer 114 of the electrical data engine 110, which formats the data for insertion into the database and sends it to the database 102. The database 102 queries the electrical data catalog 202 to determine whether a table exists in the database 102 for the data requested to be inserted. In this example, there does not exist any table in the database 102 for Energy data for January 2006 (though it may exist elsewhere, such as in the data archives 206).

FIG. 5 illustrates a flow chart diagram of a sequence of events for writing new data to a table. Electrical data is received (500) that includes a table 501 comprising a Device ID, a Topic ID, a Value, and Time information (which includes date data). The Device ID (identification) in table 501 is an identification number associated with the device from which the data was received (such as a particular electrical meter, for example). The Topic ID in table 501 corresponds to the topic or characteristic of the data received, such as any of the Topic IDs set forth in Table 1 above. The Value in table 501 corresponds to the value of the characteristic or topic specified by the Topic ID. For example, if the Topic ID is Currents, then the Value is the current value in amps that was measured by the Device. The Time information in table 501 includes any combination of second, minute, hour, day, month, and/or year at which the Value was measured by the Device. The database 102 extracts the Month and Year from the Time information (502) in table 501 (here, January 2006). The data groups are retrieved (504) from, for example, the electrical data catalog 202. The data groups include a data group table 505 that comprises a Group ID, a Group Name, and associated Topic IDs. The Group ID is a number assigned to each Group Name. The Group Name can be any of the group names specified in Table 1 above, and the Topic IDs correspond to the topics associated with the Group Name, such as specified in Table 1 above.

The database 102 determines whether the Topic ID from table 501 belongs to a group (506), and if so, the database 102 forms a Data Table Name 509 (508) that is composed of alphanumerical characters including the Organization name, the Type of data contained within the table (such as Alarms, Events, or Historical Data), the Group Name (such as Energy), the Month corresponding to the data (such as Jan), and the Year corresponding to the data (such as 2006). Using these components, the database 102 forms a new table that has a name created from these components. Each table would therefore be unique from all other tables, because a change in any of the component information, such as the Month or Year, results in a new table being created. In addition, a consistent naming regimen simplifies database design and querying. In other embodiments, the tables 200 may be identified by another naming scheme or even an arbitrary naming scheme, so long as each table is uniquely distinguishable from all other tables.

After forming the Data Table Name 509, the database 102 searches the electrical data catalog 202 to determine whether the table exists in the database 102 (510). Because all the table names conform to a predetermined naming scheme, the table name to be compared can be generated "on the fly" and compared against table names already stored in the electrical data catalog 202. If the table does exist in the database 102, the data in the data table 501 is written to that database table (512). In the illustrated example, the data in the data table 501 would be written to the table with a name ending in Energy-_January_2006. If the table does not exist in the database 102, a new table is created (514) using the naming scheme specified above, and the data in the data table 501 is written to the new table. A corresponding rule may be created and stored in the electrical data retention table 204 for the new table. In the case of a new group, the rule-creation may occur automatically (for example, all new groups may default to a default age, such as one year) or manually (in response to a valid age inputted by the operator).

Returning to 506, if the Topic ID in the table 501 does not belong to a known group in the database 102, the data in the table 501 is written to a rejected data table (516) that may be stored in the database 102 or in a storage device external to the database 102. Optionally, the electrical data catalog 202 may include entries for the rejected data tables so that when queries are run on the database 102 for data corresponding to the rejected data tables, the operator can be informed that attempts have been made to write unauthorized or unrecognizable data to the database 102.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A computer-implemented method of partitioning electrical data in a database, comprising:

defining a plurality of groups, each of the groups including a plurality of mutually distinct topics that logically relate to the corresponding group;

receiving from a plurality of monitoring devices in a power monitoring system respective electrical data that each includes a device identification (ID), at least one of a plurality of topic IDs, a value, and time information, wherein the device ID indicates an identity of the monitoring device from which the respective data was received, each of the tonic IDs represents one of the mutually distinct topics that characterizes the type of the value or represents a calculation based on the value, the value represents a measured electrical quantity measured by the monitoring device, and the time information represents the date that the value was acquired by the monitoring device;

creating a plurality of tables in the database, each of the tables being associated with one of the groups and a date that are distinct from every other table of the tables in the database such that no two of the tables in the database are associated with the same combination of group and date, such that for each of the groups, there exists a separate table per unique group and per unique date;

storing a data catalog that includes an index of the tables in the database, the index including a name of the group and the date associated with each of the tables in the database;

receiving a search request for electrical data, wherein the search request specifies one of the groups and a date, and responsive to the receiving the search request, searching the data catalog for the table associated with the specified group and date;

responsive to the searching locating the table associated with the specified group and date, targeting the requested electrical data from the located table in the database;

storing a set of data retention rules in the database, each of the rules indicating, for each group with which the tables are associated, a maximum age that is not exceeded by the value that is stored in the corresponding group in the database;

based on a first of the rules, archiving one of the tables to an archive database in response to the time information associated with the table to be archived exceeding the maximum age indicated by the first rule;

based on a second of the rules, archiving a second one of the tables to the archive database in response to the time information associated with the table to be archived exceeding the maximum age indicated by the second rule, wherein the maximum age indicated by the first rule is different from the maximum age indicated by the second rule;

responsive to one of the tables being archived, masking or removing the archived table from the index in the data catalog; and receiving a write request to write new electrical data to the database, wherein the new electrical data includes a corresponding topic ID, a corresponding value, and corresponding time information, and responsive to receiving the write request:

determining whether the corresponding topic ID in the new electrical data belongs to one of the groups, and, if so, searches the data catalog to determine whether a first table corresponding to (a) the group to which the new electrical data belongs and (b) the corresponding date from the time information associated with the new electrical data, exists in the database, and responsive to the first table being in the database, writing the new electrical data to the first table.

2. The method of claim 1, further comprising, responsive to the searching the data catalog, if the data catalog does not indicate the presence of the electrical data, searching an archive database for the electrical data based on the specified group and date.

3. The method of claim 1, if the value of the electrical data does not belong to any of the groups in the database, writing the electrical data received to a table of rejected data.

4. The method of claim 1, wherein the plurality of topics include any one or more of real energy, reactive energy, and apparent energy.

5. The method of claim 1, wherein the plurality of topics include any one or more of current, average current, and maximum current.

6. The method of claim 1, wherein at least one of the groups includes a plurality of characteristics that relate to power quality.

7. The method of claim 6, wherein the plurality of characteristics include any one or more of total harmonic distortion (THD) current, THD voltage, harmonic factor, distortion power factor, total demand distortion, crest factor, and K-factor.

8. The method of claim 1, wherein at least one of the groups includes a plurality of electrical measurements that relate to electrical demand.

9. The method of claim 8, wherein the plurality of electrical measurements include any one or more of demand current, K-factor demand, peak demand current, coincident demand, demand power, peak demand power, KW demand, KVAR demand, and KVA demand.

10. The method of claim 1, wherein the archiving is carried out remote from the database.

11. The method of claim 1, wherein the set of data retention rules are stored in an electrical data retention table in the database.

12. The method of claim 1, further comprising:
importing from the archive database an archived table into the database; and
writing into the electrical data catalog an entry corresponding to the archived table.

* * * * *